(No Model.)
G. A. BOBRICK.
ADJUSTABLE FURNITURE.
No. 567,762. Patented Sept. 15, 1896.
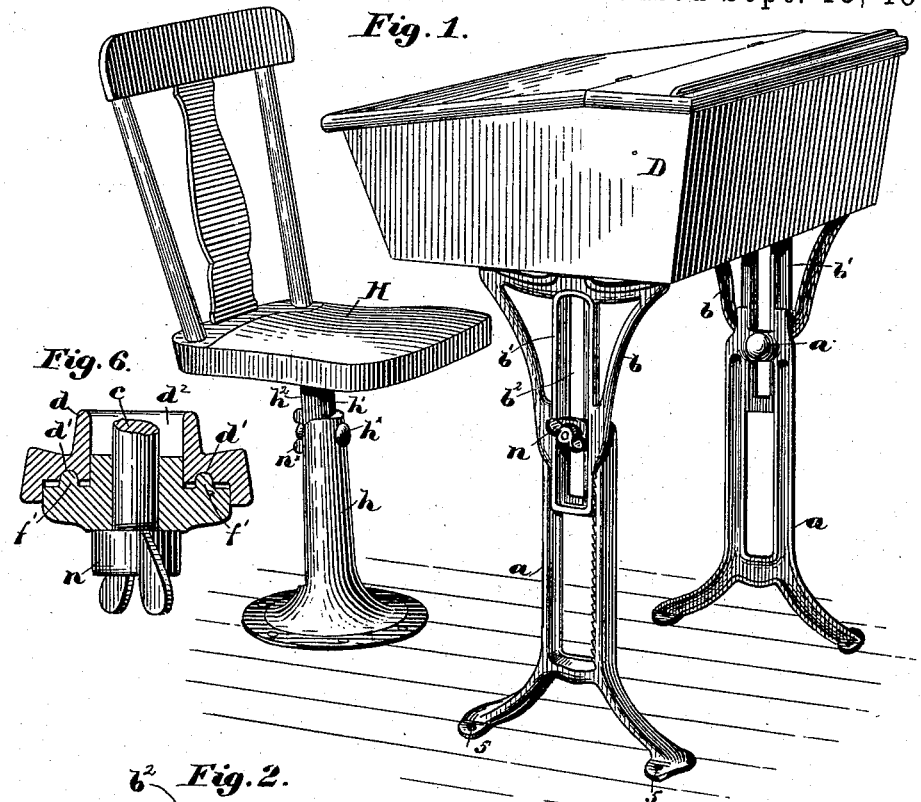
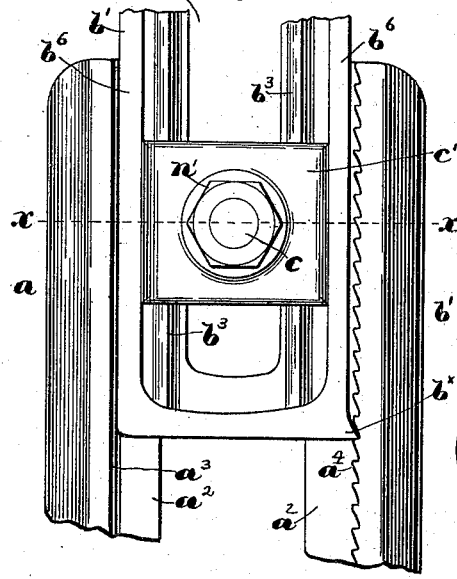
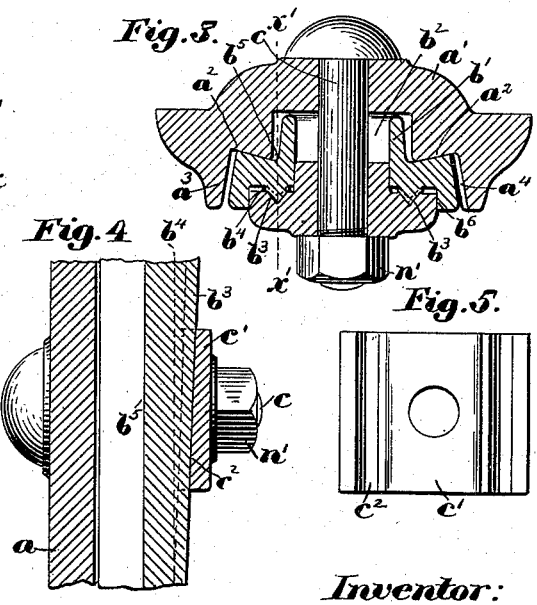
Witnesses:
Walter E. Lombard
Thomas J. Drummond
Inventor:
Gabriel A. Bobrick,
by Crosby Gregory
Attys.

UNITED STATES PATENT OFFICE.

GABRIEL A. BOBRICK, OF BOSTON, MASSACHUSETTS.

ADJUSTABLE FURNITURE.

SPECIFICATION forming part of Letters Patent No. 567,762, dated September 15, 1896.

Application filed June 10, 1896. Serial No. 594,957. (No model.)

*To all whom it may concern:*

Be it known that I, GABRIEL A. BOBRICK, of Boston, county of Suffolk, and State of Massachusetts, have invented an Improvement in Adjustable Furniture, of which the following description, in connection with the accompanying drawings, is a specification, like letters and figures on the drawings representing like parts.

This invention relates to adjustable furniture, particularly school desks and seats, whereby the movable member of the support is made vertically adjustable to accommodate the height of the pupil. By my present invention the pupil can readily adjust the furniture, the construction being simple, cheap, and durable and so arranged that after the clamping devices have been tightened downward pressure upon the movable member will the more firmly lock or clamp it in adjusted position. The pupil, while seated at the desk, can, by loosening the clamping devices, permit the movable members, secured to the desk, to settle by degrees to the desired height, as will be hereinafter fully described.

I am aware that prior to my invention standards have been made comprising upper and lower portions adjustable with reference to each other and provided with means for clamping them together, and also that such upper and lower portions have been made wedge-shaped in such manner as to be adjustable upon the inclined upper faces. The objection to such standards when applied to desks lies in the fact that when the desk is raised or lowered for adjustment the inclined faces, above referred to, tend to move out of alinement with each other for the reason that they are not parallel to the direction of adjustment of the desk, and in order to secure the desk in its new position by drawing the inclined faces together again a lateral strain is put to bear on either the upper or lower portions of the standards, or on both, which tends to loosen the fastening devices, whereby they are secured to the desk and to the floor, respectively. I am also aware that attempts have been made to overcome such defects by making the adjacent faces of the two members of the support vertical and inclining the outer face of the movable member, the said face being acted upon by a washer held in place by a clamping or retaining nut on a bolt extended from the fixed member through a longitudinal slot in the movable member. While this construction does overcome the objectionable features first stated, it is open to other objections in practical operation. The washer resting on the inclined outer face of the movable member will, when loosened to adjust, turn somewhat on the bolt, so that instead of the whole face of the washer resting upon the face of the movable member the washer will only bear partially thereupon, owing to the inclination given to the inner face of the washer. If no inclination be given the inner face of the washer, then the head of the bolt or nut will not rest firmly and solidly upon adjacent parts, and in either case the clamping tends to break one or the other part. To overcome all of the objections heretofore referred to, and to at the same time present a stronger, more durable, and efficient adjustable support, I prevent rotation of the clamp member relatively to the movable member by providing one with inclined ribs to coöperate with corresponding grooves in the other. Such construction not only prevents rotation of the clamp member when loosened, but insures its being seated in absolutely correct position when clamped, and upon such an extended surface that unequal strain upon any of the parts of the clamp device is obviated. Not only this, but the rib and groove construction provide for a "lateral" wedging, as it may be termed, of the clamp member and the adjustable member of the support, and any slight defects or inequalities in the contacting surfaces, due to the process of manufacture, are neutralized.

Figure 1 is a perspective view of a school desk and seat or chair with one embodiment of my invention applied thereto. Fig. 2 is an enlarged detail of the upper end of the fixed member and the lower end of the movable member, with the clamping mechanism. Fig. 3 is a transverse sectional view thereof on the line $x\, x$, Fig. 2. Fig. 4 is a partial longitudinal section on the line $x'\, x'$, Fig. 3, showing the coöperating portions of the standard, clamp, and movable members. Fig. 5 is an inner face view of the clamp members, and Fig. 6 is a sectional detail of a modification to be referred to.

The fixed member of each support for the desk D, Fig. 1, is shown as an open standard $a$, suitably secured to the floor, as by screws 5, having at its upper end a head $a'$ and vertical longitudinal bearing-surfaces $a^2$, which are shown in Fig. 3 as slightly beveled, two like supports for the desk being shown in Fig. 1. Outside of the bearings $a^2$ the standard projects to form walls $a^3$ $a^4$, the latter being shown as notched for a purpose to be described. The movable member of each support is shown as a bracket $b$, rigidly secured to the desk and having a central portion $b'$, which is longitudinally slotted at $b^2$. I have shown in Figs. 1 to 4, inclusive, the outer face of the central portion $b'$ of the movable member as provided with ribs $b^3$, one at each side of the slot $b^2$, and of greatest height at the upper end, decreasing gradually therefrom to the lower end. The ribs $b^3$ are triangular in cross-section in the figures just referred to, and the metal of the part $b'$ of the bracket is shown as wedge-shaped at $b^4$, Fig. 4, beneath the ribs, which latter are of uniform cross-section, so that the tops of the ribs are in a plane inclined to the vertical. A headed bolt $c$ is extended through the head $a'$ of the standard and the slot $b^2$ of the movable member $b$, and finally through a clamping member $c'$, shown as having its inner face grooved, as $c^2$, to fit the ribs $b^3$ when held thereupon by a suitable retaining-nut $n$, Fig. 1, or $n'$, Figs. 2, 3, and 4, the form of the nut being immaterial. The grooves $c^2$ are cut on the same angle as the ribs $b^3$, preferably, so that the clamping member $c'$ will always be in position to engage the adjacent portions of the ribs, thus preventing displacement of the clamping member when loosened and also positioning the latter when tightened. As best shown in Fig. 3, the movable member $b$ of the support has longitudinal bearing-faces $b^5$ to rest against the bearing $a^2$ of the fixed member, so that the said members firmly rest one against the other. I have shown the clamp member $c'$ as adapted to enter between and be guided by the sides $b^6$ of the central part of the movable member $b$, and also giving greater strength and compactness of construction. When it is desired that the pupil may adjust the desk, a suitable butterfly or thumb nut, as $n$, Fig. 1, is screwed upon the threaded end of the bolt $c$ to press the member $c'$ against the ribs $b^3$ of the movable member of the support. It will now be understood that as the bearings $a^2$ and $b^5$ are in vertical planes, and the tops of the ribs $b^3$ in planes inclined thereto, loosening of the clamp member $c'$ will permit the movable member $b$ to drop until the increased thickness between the rib tops and the bearings $b^5$ causes said member to wedge, as it were, between the clamp member $c'$ and the bearings $a^2$. Further loosening of the controlling-nut will permit additional dropping of the movable member $b$, as described, until the desired height is reached. When the height of the desk or other article is to be increased, a slight upward pull will, of course, tend to loosen the clamp, which can thereafter be tightened at the desired height. The shape of the ribs in cross-section is immaterial, as they may be square, rounded, or triangular, or, in fact, any convenient shape, the corresponding grooves in the washer being similarly shaped, but in any event the coöperation of the grooves and ribs gives a firm extended contact of the parts.

In Fig. 6 I have shown a modification which is substantially a reversal of the parts, as shown in Fig. 3, the movable member $d$ of the support having longitudinal depressions or grooves $d'$ at each side of the central slot $d^2$ to receive the ribs or ridges $f'$, formed on the inner face of the clamping member $f$, the bolt $c$ being the same as shown in the other figures. The grooves in such construction are made of uniform cross-section, but the portions of the member $d$ in which they are located are made inclined from the vertical, so that the effect is the same in operation as heretofore described. I have shown the coöperating grooves and ribs in Fig. 6 as rounded in cross-section.

The movable members $b$, as shown in Figs. 1 and 2, may be provided at or near the lower ends of the central prolongations $b'$ with a projection or toe, as $b^\times$, to engage and rest on one of the teeth in the wall $a^4$ of the standard $a$ to prevent sudden dropping of the article of furniture if the clamps are loosened too much. By pressing the upper ends of the members $b$ forward the toes $b^\times$ will be withdrawn from engagement with the wall $a^4$ when it is desired to lower the desk.

The ribs and coöperating grooves prevent lateral relative movement of the standards and their movable members.

The pedestal $h$ of the chair or seat H, Fig. 1, corresponds to the fixed standard, and the longitudinally-slotted bar $h'$, secured to the seat, corresponds to the movable member heretofore described, a bolt $h^\times$ in the pedestal extending therethrough, being provided with a retaining-nut $n^\times$ for the clamp member, (not shown,) it being grooved to engage an inclined rib $h^2$ on the bar $h'$.

Having fully described my invention, what I claim, and desire to secure by Letters Patent, is—

1. An adjustable support for furniture, comprising a fixed upright standard, and a vertically-movable longitudinally-slotted member to slide thereupon, a clamp member to coöperate with the latter, longitudinally-extended ribs projecting from one to enter grooves in the adjacent face of the other of said members, the ribs inclining in the direction of their length from the vertical face of the member upon which they are located, the bottoms of the grooves being correspondingly inclined, and means to grip the movable member between the standard and clamp member, substantially as described.

2. An adjustable support for furniture, comprising a fixed upright standard having elongated vertical bearings, and a vertically-movable, longitudinally-slotted member to slide upon said bearings, a bolt, a clamp member to coöperate with the latter, ribs on the movable member adjacent the longitudinal slot, to enter grooves in the clamp member, the ribs inclining from the vertical in the direction of their length, the bottoms of the grooves being correspondingly inclined, and a nut on the bolt to clamp the movable member between the clamp member and standard, substantially as described.

In testimony whereof I have signed my name to this specification in the presence of two subscribing witnesses.

GABRIEL A. BOBRICK.

Witnesses:
JOHN C. EDWARDS,
ADDIE FARNUM DANIELS.